US010564301B2

(12) United States Patent
Naot

(10) Patent No.: US 10,564,301 B2
(45) Date of Patent: Feb. 18, 2020

(54) SYSTEMS AND METHODS FOR DETECTOR SENSITIVITY CALIBRATION IN NUCLEAR MEDICINE IMAGING

(71) Applicant: General Electric Company, Schenectady, NY (US)

(72) Inventor: Asaf Naot, Haifa (IL)

(73) Assignee: General Electric Company, Schenectady, NY (US)

( * ) Notice: Subject to any disclaimer, the term of this patent is extended or adjusted under 35 U.S.C. 154(b) by 672 days.

(21) Appl. No.: 15/298,825

(22) Filed: Oct. 20, 2016

(65) Prior Publication Data
US 2018/0113226 A1    Apr. 26, 2018

(51) Int. Cl.
G01T 1/29    (2006.01)
G01T 1/164    (2006.01)

(52) U.S. Cl.
CPC .......... G01T 1/2985 (2013.01); G01T 1/1642 (2013.01)

(58) Field of Classification Search
CPC .............................. G01T 1/2985; G01T 1/1642
USPC ........................................................ 702/104
See application file for complete search history.

(56) References Cited

U.S. PATENT DOCUMENTS

| 5,600,145 | A | * | 2/1997 | Plummer | ............... | G01T 1/1615 |
| | | | | | | 250/363.04 |
| 8,384,015 | B2 | | 2/2013 | Blevis et al. | | |
| 8,876,377 | B2 | | 11/2014 | Silberklang et al. | | |
| 9,439,607 | B2 | | 9/2016 | Khen et al. | | |
| 2007/0194222 | A1 | * | 8/2007 | Takayama | ............. | G01T 1/1663 |
| | | | | | | 250/252.1 |
| 2010/0243907 | A1 | * | 9/2010 | Jansen | .................. | G06T 11/006 |
| | | | | | | 250/370.09 |
| 2016/0356894 | A1 | * | 12/2016 | Bhattacharya | ......... | A61B 6/037 |

OTHER PUBLICATIONS

Quantitative Evaluation of Scintillation Camera Imaging Characteristics of Isotopes used in Liver Radioembolization (Year: 2011).*
Bailey, D. et al., "An Evidence-Based Review of Quantitative SPECT Imaging and Potential Clinical Applications," Journal of Nuclear Medicine, vol. 54, No. 1, Jan. 2013, 7 pages.
Levy, M. et al., "Systems and Methods for Calibrating a Nuclear Medicine Imaging System," U.S. Appl. No. 15/298,940, filed Oct. 20, 2016, 35 pages.

* cited by examiner

Primary Examiner — Michael P Nghiem
Assistant Examiner — Dacthang P Ngo
(74) Attorney, Agent, or Firm — McCoy Russell LLP

(57) ABSTRACT

Methods and systems are provided for adjusting sensitivity of detectors in a nuclear medicine imaging system based on a sensitivity table. In one embodiment, a method comprises acquiring, with a detector including a collimator, scan data of a subject administered with a radioisotope; calculating a sensitivity of the detector based on the collimator and the radioisotope; and calculating a quantitative parameter from the acquired scan data of the subject based on the calculated sensitivity. In this way, SPECT quantitation may be accurately performed due to the increased accuracy of detector sensitivity for a given collimator and radioisotope without specifically calibrating the detector for the given collimator and radioisotope.

16 Claims, 3 Drawing Sheets

| | Tc99m | Ga67 | Lu177 |
|---|---|---|---|
| LEHR | 150 | 160 | 140 |
| MEGP | 160 | 180 | 153 |
| LEHS | 190 | 200 | 210 |
| Lympho | 155 | 165 | 145 |

SYSTEMS AND METHODS FOR DETECTOR SENSITIVITY CALIBRATION IN NUCLEAR MEDICINE IMAGING

FIELD

Embodiments of the subject matter disclosed herein relate to medical imaging systems, and more particularly, to detector sensitivity calibration in nuclear medicine (NM) imaging systems.

BACKGROUND

Nuclear medicine (NM) imaging systems, such as Single Photon Emission Computed Tomography (SPECT) imaging systems, use one or more image detectors to acquire image data, such as gamma ray or photon image data. The image detectors may be gamma cameras that acquire two-dimensional views of three-dimensional distributions of radionuclides (from an injected radioisotope) from a patient being imaged.

In SPECT imaging systems, collimators may be placed in front of a scintillation crystal or solid state detector to focus the field of view (FOV) of the detectors. The collimators allow gamma rays aligned with the holes of the collimators to pass through to the detector. These detectors need to be calibrated, including during manufacture and periodically after installation at a clinical site, to ensure proper imaging operation. For example, the detectors are calibrated to provide a uniform energy and sensitivity response across the detector units or output channels.

However, the sensitivity of a SPECT detector may vary based on the type of collimator as well as the type of radioisotope administered to the patient. Such variability in sensitivity limits the accuracy of quantitative measurements with SPECT imaging. To increase precision of quantitative measurements, the sensitivity of a detector may be calibrated for a specific combination of a collimator and radioisotope to be used in a clinical study. However, such calibrations are time-consuming, and require that the imaging system operator has access to the appropriate phantom for a certain radioisotope in addition to knowledge of the different calibration processes for different collimators and radioisotopes.

BRIEF DESCRIPTION

In one embodiment, a method comprises acquiring, with a detector including a collimator, scan data of a subject administered with a radioisotope; calculating a sensitivity of the detector based on the collimator and the radioisotope; and calculating a quantitative parameter from the acquired scan data of the subject based on the calculated sensitivity. In this way, SPECT quantitation may be accurately performed due to the increased accuracy of detector sensitivity for a given collimator and radioisotope without specifically calibrating the detector for the given collimator and radioisotope.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of nuclear medicine imaging systems. In particular, systems and methods are provided for adjusting sensitivity of detectors in a NM imaging system based on a sensitivity table. A NM imaging system, such as the SPECT imaging system depicted in FIGS. 1-2, may include a plurality of detectors that can be equipped with different collimators. The detectors may acquire image scan data of a subject administered with a radioisotope, and the imaging system may then generate an image of the position of the administered radioisotope within the subject. The known sensitivity of the detectors may be automatically calibrated or adjusted based on a pre-determined sensitivity table that indicates the sensitivity of the detectors for different combinations of collimators and radioisotopes. A method for creating such a sensitivity table, such as the method shown in FIG. 3, may include measuring the sensitivity of each detector of an imaging system for each combination of a plurality of collimators and radioisotopes, and storing the measured sensitivities in a suitable data structure. An example of such a sensitivity table is depicted in FIG. 4. The sensitivity table may be created by a manufacturer of the imaging system, for example, and then installed in the processing units of similar imaging systems produced by the manufacturer. At the clinical site wherein an imaging system may be installed, an operator of the imaging system only needs to perform a sensitivity measurement for a single combination of collimator and radioisotope. A method for utilizing the sensitivity table, such as the method depicted in FIG. 5, may then include calculating an adjusted sensitivity based on the single sensitivity measurement and the sensitivity table. Consequently, the accuracy of quantitative measurements performed with the imaging system is increased.

In the context of this disclosure, the term sensitivity refers to the ratio of the measured counting rate to the activity present in the object. In other words, the sensitivity denotes the fraction of incident photons that an imaging system actually detects from a total number of radionuclide emissions. In general, scanner sensitivity changes over time due to changes in temperature and humidity, as well as aging of the detector electronics. The systems and methods described herein enable the sensitivity of an imaging system to be accurately calibrated with a single sensitivity measurement for a given collimator-radioisotope combination. Advantageously, the clinical site wherein the imaging system is installed does not need to store and maintain a plurality of phantoms with different radioisotopes for sensitivity calibration; instead, a single phantom is sufficient. In addition, SPECT and PET quantitation can be accurately performed without regular, time-consuming detector calibration.

Figure 1:
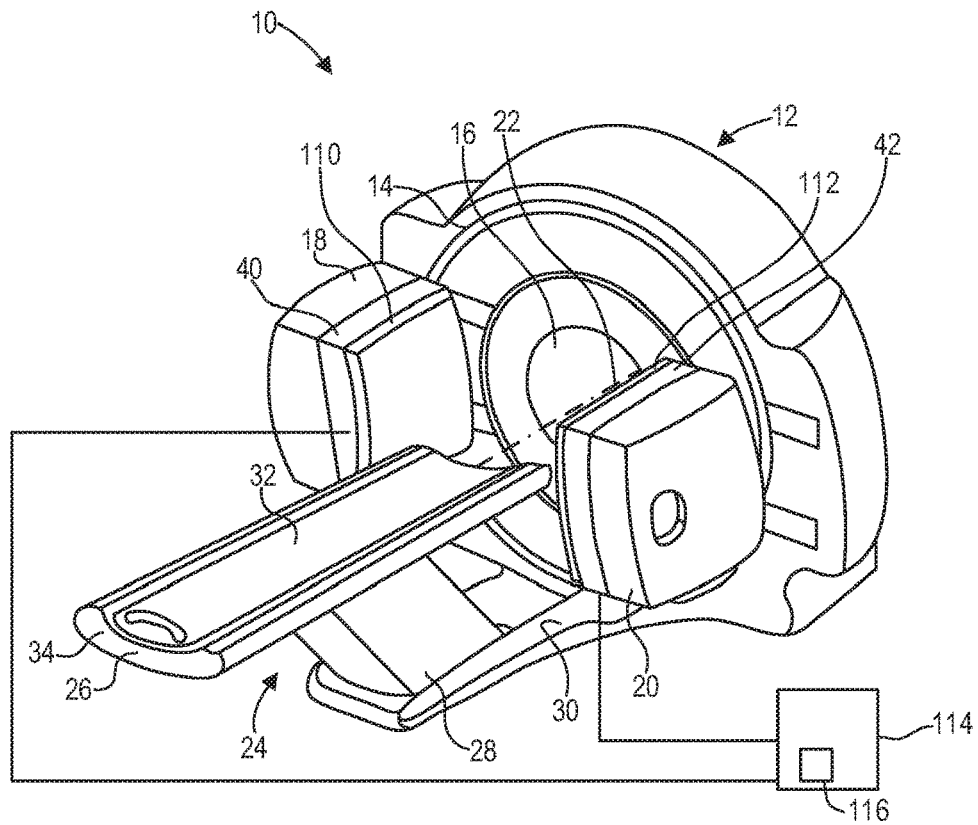
FIG. 1 is a perspective view of an exemplary imaging system constructed in accordance with an embodiment.

FIG. 1 is a perspective view of an exemplary nuclear medicine imaging system 10 constructed in accordance with various embodiments, which in this embodiment is a single-photon emission computed tomography (SPECT) imaging system. The system 10 includes an integrated gantry 12 that further includes a rotor 14 oriented about a gantry central bore 16. The rotor 14 is configured to support one or more nuclear medicine (NM) cameras 18 and 20. The cameras 18 and 20 may be embodied as gamma cameras, Ultra-Fast Cameras (UFC), SPECT detectors, multi-layer pixelated cameras (e.g., Compton camera), and/or positron emission tomography (PET) detectors. It should be noted that when the medical imaging system 10 is a multi-modality system, a CT camera or an x-ray camera may be provided, such as an x-ray tube (not shown) for emitting x-ray radiation towards the detectors. The rotor 14 is further configured to rotate axially about an examination axis 22.

A patient table 24 may include a bed 26 that is slidingly coupled to a bed support system 28, which may be coupled directly to a floor or may be coupled to the gantry 12 through a base 30 coupled to the gantry 12. The bed 26 may include a stretcher 32 slidingly coupled to an upper surface 34 of the bed 26. The patient table 24 is configured to facilitate ingress and egress of a patient (not shown) into an examination position that is substantially aligned with the examination axis 22. During an imaging scan, the patient table 24 may be controlled to move the bed 26 and/or stretcher 32 axially into and out of the bore 16. The operation and control of the imaging system 10 may be performed in any manner known in the art. It should be noted that the various embodiments may be implemented in connection with imaging systems that include rotating gantries or stationary gantries.

In one embodiment, cameras 18 and 20 each include a collimator 40 and 42, respectively. In some examples, collimators 40 and 42 each comprise a multi-bore collimator, such as a parallel-hole collimator. However, other types of collimators, such as converging or diverging collimators may optionally or alternatively be used. Other examples for the collimators 40 and 42 include pinhole, multi-pinhole, parallel-beam converging, diverging fan-beam, converging or diverging cone-beam, multi-bore converging, multi-bore converging fan-beam, multi-bore converging cone-beam, multi-bore diverging, or other types of collimators. In some examples, the collimators 40 and 42 may be exchanged with other collimator types between scans.

Optionally, collimators 40 and 42 may be constructed to be registered with pixels of the cameras 18 and 20, which in one embodiment are CZT detectors. However, other materials may be used. Registered collimation may improve spatial resolution by forcing photons going through one bore to be collected primarily by one pixel. Additionally, registered collimation may improve sensitivity and energy response of pixelated detectors as detector area near the edges of a pixel or in between two adjacent pixels may have reduced sensitivity or decreased energy resolution or other performance degradation. Having collimator septa directly above the edges of pixels reduces the chance of a photon impinging at these degraded performance locations, without decreasing the overall probability of a photon passing through the collimator.

In one embodiment, the imaging system 10 also includes a proximity detection system (PDS) which may form part of an automatic body contouring system (ABS) not shown. In operation, the PDS facilitates maintaining the gamma cameras 18 and 20 in relatively close proximity to the imaged subject, such as for example, a patient being imaged without contacting the patient or each other. Accordingly, in some embodiments, the PDS includes a first patient safety device or sensor array 110 and a second patient safety device or sensor array 112. As used herein, an array is an arrangement of electronic parts that together form the sensor arrays 110 and/or 112. The sensor array 110 is coupled to a scanning surface of the camera 18 and the sensor array 112 is coupled to a scanning surface of the camera 20. In one embodiment, the sensor arrays 110 and 112 are coupled directly to the scanning surface of the cameras 18 and 20, respectively. In one embodiment, the cameras 18 and 20 each include a collimator, 40 and 42, respectively and the sensor arrays 110 and 112 are coupled to the scanning surface of the collimators 40 and 42.

In one embodiment, the sensor array 110 is fabricated to be flexible to enable the sensor array 110 to be mounted flush to the surface of either the gamma camera 18 or the collimator 40 (shown in FIG. 1) when utilized. More specifically, after the sensor array 110 is coupled to the gamma camera 18, the sensor array 110 has a profile that is substantially complementary to a profile of the gamma camera 18 such that the sensor array 110 is substantially flush with, and in physical contact with, the scanning surface of the gamma camera 18. Accordingly, portions of the sensor array 110 may be fabricated using, for example, a flexible material such as, but not limited to, metal-on-polyimide, an aramid, a fluorocarbon, and a polyester.

The outputs from the sensor arrays 110 and 112 are input to a computer 114. As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer 114 is coupled to, and receives information from, the sensor arrays 110 and 112. In one embodiment, the computer 114 may include a proximity detection system module 116 that is configured to utilize the information received from the sensor arrays 110 and 112 to reposition the cameras 18 and 20 and/or to generate a visual and/or audio indication to an operator that the cameras 18 and/or 20 may contact each other or the patient. In operation, the contouring module 116 executes a set of instructions that are stored in one or more storage elements, in order to process the data received from the sensor arrays 110 and 112. The storage elements may also store data or other information as desired or needed. The storage element may be in the form of an information source or a physical memory element within either the computer 114 or the module 116.

The set of instructions may include various commands that instruct the computer or processor as a processing machine to perform specific operations such as the methods and processes of the various embodiments. The set of instructions may be in the form of a software program. The software may be in various forms such as system software or application software. Further, the software may be in the form of a collection of separate programs or modules, a program module within a larger program, or a portion of a program module. The software also may include modular programming in the form of object-oriented programming. The processing of input data by the processing machine may be in response to operator commands, or in response to results of previous processing, or in response to a request made by another processing machine. The set of instructions may be embodied as a tangible non-transitory computer readable medium.

As used herein, the terms "software" and "firmware" are interchangeable, and include any computer program stored in memory for execution by a computer, including RAM, ROM, EPROM, EEPROM, and non-volatile RAM (NVRAM). The above memory types are exemplary only, and are thus not limiting as to the types of memory usable for storage of a computer program.

Figure 2:
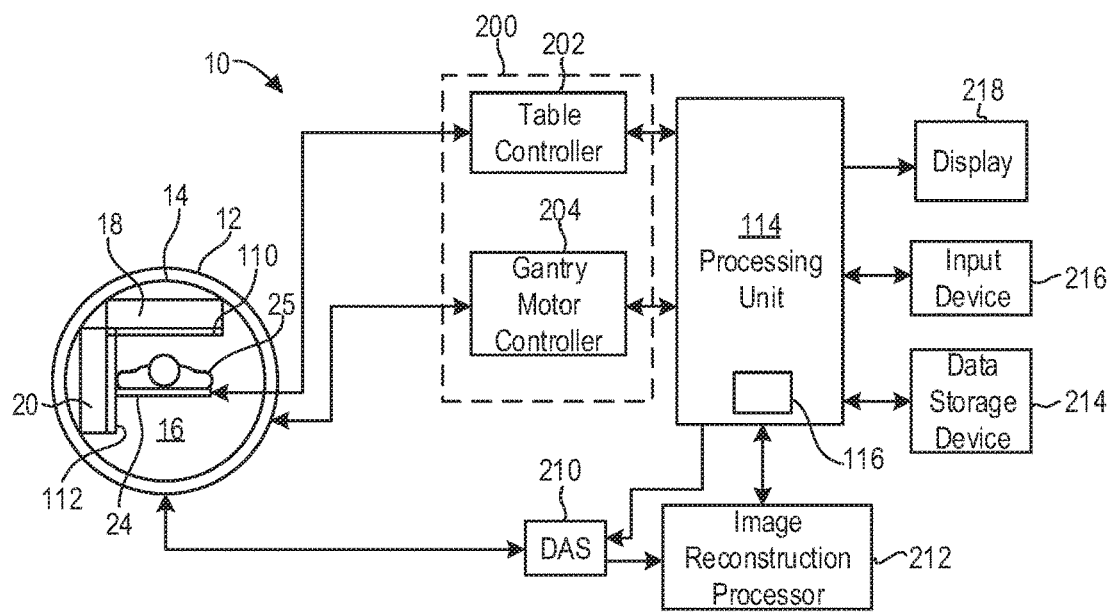
FIG. 2 is a schematic block diagram of the exemplary imaging system shown in FIG. 1.
Figures 3, 4:
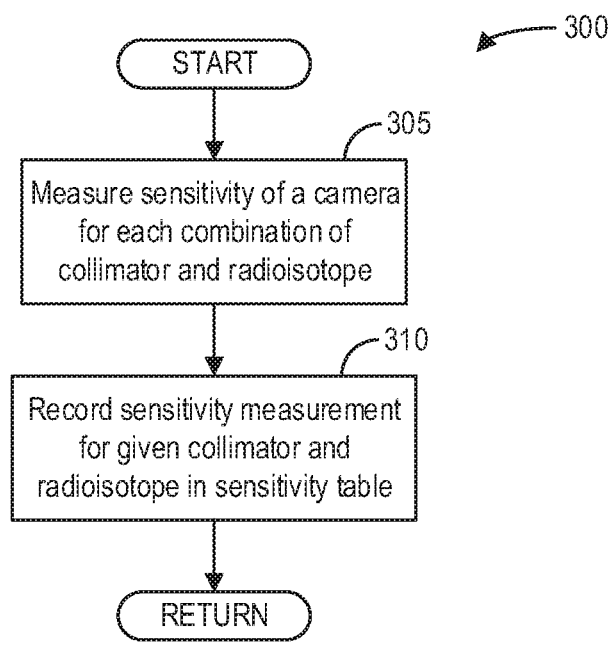
FIG. 3 shows a high-level flow chart illustrating an example method for creating a system sensitivity table in accordance with an embodiment.
FIG. 4 shows a graph illustrating an example sensitivity table in accordance with an embodiment.

FIG. 2 is a block diagram of the exemplary imaging system 10 shown in FIG. 1. It should be noted that the imaging system may also be a multi-modality imaging system, such as an NM/CT imaging system. The imaging system 10, illustrated as a SPECT imaging system, generally includes, as discussed above, the gantry 12 and the rotor 14 that is oriented about a gantry central bore 16. The rotor 14 is configured to support one or more NM pixelated cameras 18 and 20.

The patient table 24 is configured to facilitate ingress and egress of a patient 25 into an examination position that is substantially aligned with the examination axis 22. During an imaging scan, the patient table 24 may be controlled by a table controller unit 202 to move the patient table 24 axially into and out of the bore 16. In one embodiment, the imaging system 10 also includes the proximity detection system (PDS) module 116. In operation, the PDS module 116 facilitates maintaining the gamma cameras 18 and 20 in relatively close proximity to a region of interest, such as for example, a patient being imaged without contacting the patient or each other. Accordingly, the PDS may include a first patient safety device or sensor array 110 and a second patient safety device or sensor array 112. The outputs from the sensor arrays 110 and 112 are input to the computer 114.

The gamma cameras 18 and 20 may be located at multiple positions (e.g., in an L-mode configuration) with respect to the patient 25. It should be noted that the gamma cameras 18 and 20 are configured for movable operation along (or about) the gantry 12. The table controller unit 202 may control the movement and positioning of the patient table 24 with respect to the gamma cameras 18 and 20 with respect to the patient 25 to position the desired anatomy of the patient 25 within the fields of view (FOVs) of the gamma cameras 18 and 20, which may be performed prior to acquiring an image of the anatomy of interest. The controller unit 200 includes the table controller 202 and a gantry motor controller 204 that each may be automatically commanded by the computer 114, manually controlled by an operator, or a combination thereof. The table controller 202 may move the patient table 24 to position the patient 25 relative to the FOV of the gamma cameras 18 and 20. The imaging data may be combined and reconstructed into an image, which may comprise 2D images, a 3D volume, or a 3D volume over time (4D).

A data acquisition system (DAS) 210 receives analog and/or digital electrical signal data produced by the gamma cameras 18 and 20 and decodes the data for subsequent processing as described in more detail herein. An image reconstruction processor 212 receives the data from the DAS 210 and reconstructs an image using any reconstruction process known in the art. A data storage device 214 may be provided to store data from the DAS 210 and/or reconstructed image data. An input device 216 may also be provided to receive user inputs and a display 218 may be provided to display reconstructed images.

FIG. 3 shows a high-level flow chart illustrating an example method 300 for creating a sensitivity table in accordance with an embodiment. In particular, method 300 relates to measuring scanner sensitivity for different combinations of collimators and radiopharmaceuticals. Method 300 will be described herein with reference to the system and components depicted in FIGS. 1-2, though it should be understood that the method may be applied to other systems without departing from the scope of this disclosure. Method 300 may be carried out by processing unit 150, and may be stored as executable instructions in non-transitory memory of the processing unit 150.

Method 300 begins at 305. At 305, method 300 measures the sensitivity of a gamma camera for each combination of collimator and radioisotope. Specifically, for each collimator of a plurality of collimators that may be used with a gamma camera, method 300 measures the sensitivity of each gamma camera or detector head of a scanner for a plurality of radioisotopes that may be used for NM imaging.

The sensitivity of a gamma camera is measured as the number of detected counts per unit time per unit source activity for a specified energy window and geometry of measurement. The intrinsic sensitivity is typically tens of thousands times higher than that through low-energy, parallel-hole collimators. Since the camera is never used for imaging without a collimator, it is the sensitivity of the total system that is of interest as well as the relative sensitivity between the available collimators.

An operator of the imaging system may, for example, install a first type of collimator on each detector of the imaging system. The operator may then position a first phantom including a first radioisotope within the imaging system, and operate the imaging system to image the phantom. After recording the sensitivity to the first radioisotope of each camera with the first collimator, the operator may then remove the first phantom. The operator may then position a second phantom including a second radioisotope within the imaging system, and operate the imaging system to measure the sensitivity to the second radioisotope of each camera with the first collimator. After repeating this process for a plurality of radioisotopes, the operator may un-install the first collimators, and then install a second type of collimator on each detector of the imaging system. The operator may then repeatedly operate the imaging system to measure the sensitivity to each of the plurality of radioisotopes for each camera with the second collimator. This process is repeated for each collimator of a plurality of collimators. However, it should be appreciated that in some examples, the process may only be carried out with a single detector of the imaging system rather than each detector of the imaging system.

The plurality of collimators may include, but are not limited to, parallel hole collimators such as low-energy all-purpose (LEAP) collimators, low-energy high-resolution (LEHR) collimators, as well as high- and medium-energy collimators. Other types of collimators that may be tested include slanthole collimators, converging collimators, diverging collimators, fanbeam collimators, pinhole collimators, and so on.

The plurality of radioisotopes include, but are not limited to, technetium-99, technetium-99m, iodine-123, indium-111, cobalt-57, lutetium-177, samarium-153, xenon-133, chromium-51, krypton-81m, thallium-201, gallium-67, selenium-75, and so on. Other radioisotopes and isotopes of the radioisotopes discussed above may also be tested, including, for example, other isotopes of iodine such as iodine-125 and iodine-131.

After measuring the sensitivity of each camera for each combination of collimator and radioisotope, method 300 continues to 310. At 310, method 300 records the sensitivity measurements for each combination of collimator and radioisotope in a sensitivity table. In examples wherein the sensitivity of each detector is measured, the plurality of sensitivity measurements (i.e., the collection of sensitivity measurements for each camera) for a given combination of collimator and radioisotope may be averaged, as a non-limiting example, and the average sensitivity measurement may be recorded in the sensitivity table. Further, for pixelated detectors, the sensitivity measurement of a pixelated detector may comprise an average sensitivity for all pixels of the detector. This sensitivity table may then be installed on similar imaging systems for simplifying sensitivity calibrations of the other imaging systems, as described further herein with regard to FIG. 5. Method 300 then ends.

Method 300 may be carried out by the manufacturer of the imaging system to create the sensitivity table. While method 300 is described with reference to a single imaging system, it should be appreciated that the method may be applied to a plurality of imaging systems at the manufacturing site, such that the sensitivity table may include statistically-robust sensitivity measurements.

FIG. 4 shows a graph illustrating an example sensitivity table 400 in accordance with an embodiment. For each combination of radioisotope 402 and collimator 404, the sensitivity table 400 includes a detector sensitivity measurement 406 expressed in counts per second (cps) per megabecquerel (MBq).

The sensitivity table 400 includes sensitivity measurements 406 for a plurality of collimators 404, including a low-energy high-resolution (LEHR) collimator, a medium-energy general-purpose (MEGP) collimator, a low-energy high-sensitivity (LEHS) collimator, and a special-purpose collimator for detecting lymphoma (Lympho). The sensitivity table 400 includes sensitivity measurements 406 for a plurality of radioisotopes, including technetium-99m (Tc99m), gallium-67 (Ga67), and lutetium-177 (Lu177). Although the sensitivity table 400 depicts only three radioisotopes and four collimators, it should be appreciated that the sensitivity table may include sensitivity measurements for more than three radioisotopes and more than four collimators.

As discussed further herein below, the sensitivity table 400 enables a simplified process for calibrating the sensitivity of an imaging system. Specifically, an operator of an imaging system including the sensitivity table 400 only needs to perform a sensitivity measurement for a single combination of a collimator and a radioisotope in order to calibrate the imaging system for other combinations of collimators and radioisotopes. For example, the imaging system may adjust the sensitivity for a given collimator-radioisotope combination based on a single measurement, using a formula such as:

$$S_{c,r;adj} = S_{c,r;tab} * \frac{S_{c0,r0;meas}}{S_{c0,r0;tab}},$$

where $S_{c,r;adj}$ is the adjusted sensitivity for a collimator c and a radioisotope r, $S_{c,r;tab}$ is the sensitivity for the collimator c and the radioisotope r stored in the sensitivity table, $S_{c0,r0;meas}$ is the sensitivity measured by the imaging system using the collimator c0 and the radioisotope r0, and $S_{c0,r0;tab}$ is the sensitivity for the collimator c0 and the radioisotope r0 stored in the sensitivity table.

For example, an operator of a NM imaging system at a clinical site may perform a sensitivity measurement using an LEHR collimator and technetium-99m, and determine that the measured sensitivity is 148 cps/MBq for the LEHR collimator and technetium-99m. When using the same imaging system with a MEGP collimator and a gallium-67 radioisotope, the imaging system may calculate an adjusted sensitivity for the combination of the MEGP collimator and gallium-67 using the above equation. With reference to the example sensitivity measurements 406 of the sensitivity table 400, the adjusted sensitivity may be:

$$S_{MEGP,Ga67;adj} = S_{MEGP,Ga67;tab} * \frac{S_{LEHR,Tc99m;meas}}{S_{LEHR,Tc99m;tab}}$$
$$= \left(180\frac{cps}{MBq}\right) * \left(\frac{148}{150}\right)$$
$$= 177.6\frac{cps}{MBq}.$$

Thus, the imaging system may adjust the sensitivity for the combination of the MEGP collimator and gallium-67 to 177.6 cps/MBq when performing SPECT quantitation, instead of using the predetermined sensitivity of 180 cps/MBq. In this way, the accuracy of SPECT quantitation is increased without the need for calibrating an imaging system for each collimator-radioisotope combination.

Figure 5:
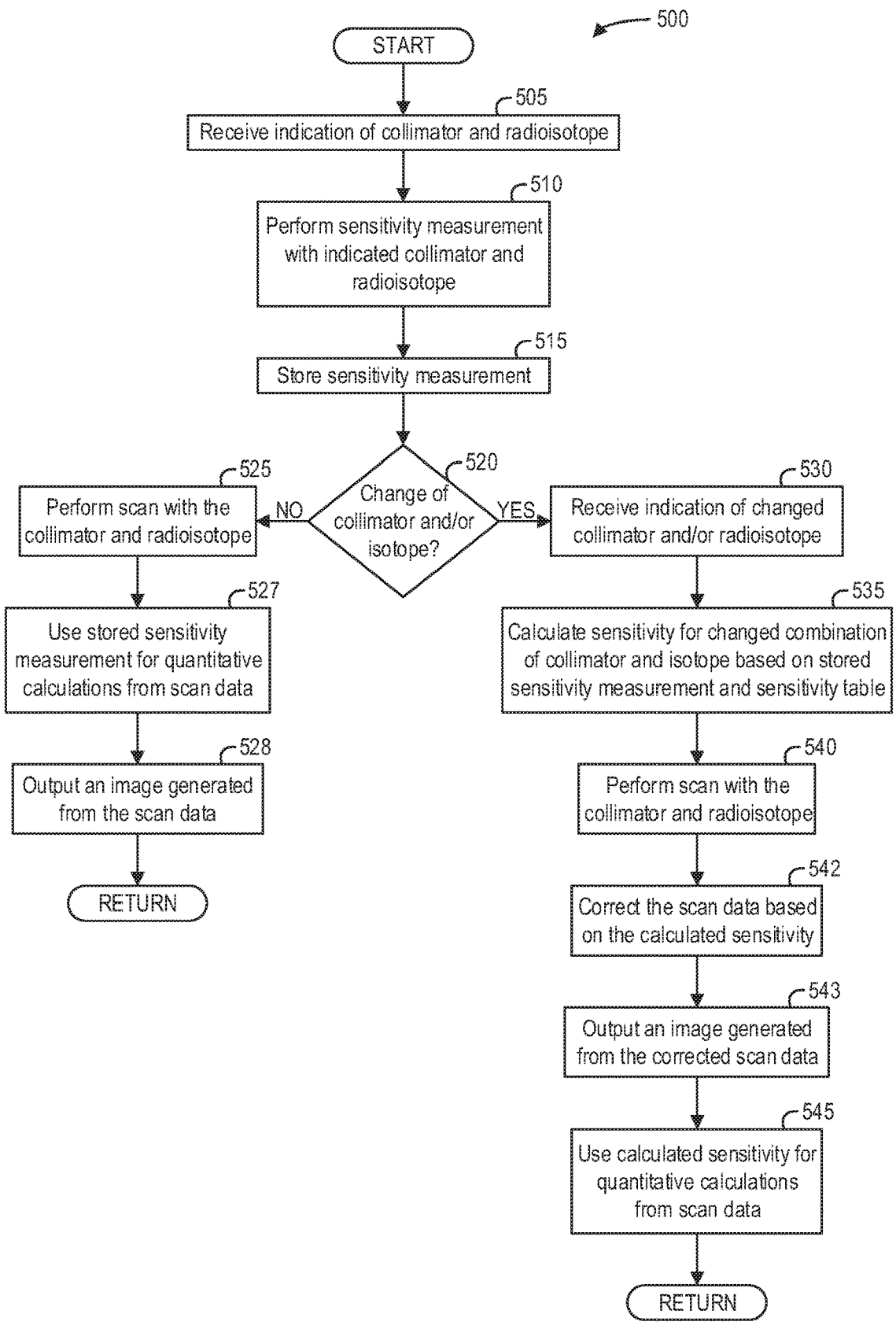
FIG. 5 shows a high-level flow chart illustrating an example method for utilizing a sensitivity table in accordance with an embodiment.

FIG. 5 shows a high-level flow chart illustrating an example method 500 for utilizing a sensitivity table in a scanner in accordance with an embodiment. Method 500 will be described with reference to the system and components of FIGS. 1-2, though it should be understood that the method may be applied to other systems without departing from the scope of this disclosure. Method 500 may be carried out by processing unit 150, and may be stored as executable instructions in non-transitory memory of the processing unit 150.

Method 500 begins at 505. At 505, method 500 receives an indication of a collimator and a radioisotope to be used in a sensitivity measurement. At 510, method 500 performs the sensitivity measurement with the indicated collimator and radioisotope. At 515, method 500 stores the sensitivity measurement. The stored sensitivity measurement may be subsequently retrieved for performing quantitation with respect to the collimator and radioisotope, as well as adjusting sensitivity for other collimator-radioisotope combinations based on the sensitivity table.

Continuing at 520, method 500 determines if there is a change in collimator and/or radioisotope. If there is no change in collimator and/or radioisotope ("NO"), method 500 proceeds to 525. At 525, method 500 performs a scan with the collimator and the radioisotope indicated at 505. Specifically, the method scans, using one or more detectors equipped with the indicated collimator, a subject injected with the indicated radioisotope. Continuing at 527, method 500 uses the stored sensitivity measurement obtained at 510 for quantitative calculations from the scan data acquired at 525. As a non-limiting example, the method may calculate a standardized uptake value (SUV) based on the stored sensitivity. To that end, since SUV is the ratio of the image-derived radioactivity concentration and the whole-body concentration of the injected radioisotope, the stored sensitivity may be used to correct the image-derived radioactivity concentration. Further, at 528, the method may output an image generated from the scan data. Since the scan data is corrected with the stored sensitivity, the image output may be more accurate than an image generated from uncorrected scan data. Method 500 then ends.

However, referring again to 520, if there is a change in collimator and/or radioisotope ("YES"), method 500 proceeds to 530. At 530, method 500 receives an indication of the changed collimator and/or radioisotope. As an illustrative example, an operator of the imaging system may input, via an input device such as input device 166, an indication of a different collimator and/or radioisotope to be used for a scan. At 535, method 500 calculates the sensitivity for the changed combination of collimator and radioisotope based on the stored sensitivity measurement and the sensitivity table. For example, as discussed above, the method may calculated the adjusted sensitivity $S_{c,r;adj}$ for a collimator c and a radioisotope r from the equation:

$$S_{c,r;adj} = S_{c,r;tab} * \frac{S_{c0,r0;meas}}{S_{c0,r0;tab}},$$

where $S_{c,r;tab}$ is the sensitivity for the collimator c and the radioisotope r stored in the table, $S_{c0,r0;meas}$ is the sensitivity measured at 510 with the collimator c0 and the radioisotope r0 indicated at 505, and $S_{c0,r0;tab}$ is the sensitivity for the collimator c0 and the radioisotope r0 stored in the sensitivity table.

Continuing at 540, method 500 performs a scan with the collimator and radioisotope. Specifically, the method scans, with one or more detectors equipped with the collimator, a subject injected with the radioisotope. Continuing at 542, method 500 may correct the scan data based on the calculated sensitivity. For example, if the calculated sensitivity indicates that the sensitivity of the detector with the collimator is less than or greater than the predetermined (e.g., by the manufacturer or during another previous calibration) sensitivity of the detector with the collimator, then the scan data may be corrected to account for the different sensitivity of the detector.

At 543, method 500 may output an image generated from the corrected scan data. The brightness of certain pixels may be increased or decreased to a more accurate level due to the corrected scan data in comparison to the brightness of the same pixels in an image generated from the uncorrected scan data.

Continuing at 545, method 500 uses the calculated sensitivity for quantitative calculations from the scan data acquired at 540. For example, the method may calculate the SUV based on the sensitivity calculated at 535, as discussed hereinabove. Method 500 then ends.

It should be appreciated that in some examples, the method may not calculate the adjusted sensitivity at 535 prior to performing the scan with the changed collimator and/or radioisotope. Instead, the method may calculate the adjusted sensitivity at least prior to performing quantitative calculations from the scan data. Therefore, the method may perform 535 after 540, in some examples.

A technical effect of the disclosure is the automatic sensitivity calibration of a detector for any combination of collimator and radioisotope based on a single measurement with the detector of one combination of collimator and radioisotope. Another technical effect of the disclosure is the increased accuracy of quantitation with nuclear medicine. Yet another technical effect of the disclosure is the increased accuracy of an image generated with an imaging system for a given collimator and radioisotope without specifically calibrating the imaging system for the given collimator and radioisotope.

In one embodiment, a method comprises: acquiring, with a detector including a collimator, scan data of a subject administered with a radioisotope; calculating a sensitivity of the detector based on the collimator and the radioisotope; and calculating a quantitative parameter from the acquired scan data of the subject based on the calculated sensitivity. In a first example of the method, the method further comprises acquiring, with the detector including a second collimator, scan data of a phantom including a second radioisotope, and measuring sensitivity of the detector including the second collimator to the second radioisotope. In a second example of the method optionally including the first example, the method further comprises: acquiring, with the detector including a third collimator, scan data of a second subject administered with a third radioisotope; calculating a second sensitivity of the detector including the third collimator based on a sensitivity table and the measured sensitivity of the detector including the second collimator to the second radioisotope; and calculating the quantitative parameter from the acquired scan data of the second subject based on the calculated second sensitivity. In a third example of the method optionally including one or more of the first and second examples, calculating the sensitivity of the detector comprises retrieving, from a sensitivity table, a predetermined sensitivity of the detector for the collimator and the radioisotope, and adjusting the predetermined sensitivity based on the measured sensitivity of the detector including the second collimator to the second radioisotope. In a fourth example of the method optionally including one or more of the first through third examples, the sensitivity table includes a sensitivity measurement for each combination of a plurality of collimators and a plurality of radioisotopes, wherein the plurality of collimators include one or more of a parallel hole collimator, a slanthole collimator, a converging collimator, a diverging collimator, a fanbeam collimator, and a pinhole collimator, and wherein the plurality of radioisotopes includes one or more of an isotope of technetium, an isotope of iodine, an isotope of cobalt, an isotope of indium, an isotope of selenium, an isotope of xenon, an isotope of samarium, an isotope of chromium, an isotope of krypton, an isotope of thallium, and an isotope of gallium. In a fifth example of the method optionally including one or more of the first through fourth examples, the quantitative parameter comprises a standardized uptake value. In a sixth example of the method optionally including one or more of the first through fifth examples, the method further comprises correcting the acquired scan data based on the calculated sensitivity, and the quantitative parameter is calculated based on the corrected acquired scan data. In a seventh example of the method optionally including one or more of the first through sixth examples, the method further comprises displaying, via a display device, an image generated from the corrected acquired scan data.

In another embodiment, a system comprises: a detector configured to detect radiation and to generate electrical signals in response to the detected radiation; and a processor communicatively coupled to the detector and configured with instructions in non-transitory memory that when executed cause the processor to: acquire, with the detector equipped with a first collimator, scan data of a phantom including a first radioisotope; measure a sensitivity of the detector equipped with the first collimator to the first radioisotope based on the acquired scan data of the phantom; acquire, with the detector equipped with a second collimator, scan data of a subject administered with a second radioisotope; calculate a sensitivity of the detector equipped with the second collimator to the second radioisotope based on the measured sensitivity of the detector equipped with the first collimator to the first radioisotope and a sensitivity table stored in the non-transitory memory; and correct the acquired scan data of the subject based on the calculated sensitivity.

In a first example of the system, the system further comprises a display device communicatively coupled to the processor, wherein the processor is further configured with instructions in the non-transitory memory that when executed cause the processor to output, via the display device, an image generated from the corrected scan data. In a second example of the system optionally including the first example, the sensitivity table includes a sensitivity measurement for each combination of a plurality of collimators and a plurality of radioisotopes. In a third example of the system optionally including one or more of the first and second examples, the processor is further configured with instructions in the non-transitory memory that when executed cause the processor to calculate a quantitative parameter from the acquired scan data of the subject based on the calculated sensitivity. In a fourth example of the system optionally including one or more of the first through third examples, the quantitative parameter comprises a standardized uptake value. In a fifth example of the system optionally including one or more of the first through fourth examples, the system further comprises an input device communicatively coupled to the processor, wherein the processor is further configured with instructions in the non-transitory memory that when executed cause the processor to receive, from the input device, an indication of the second collimator and the second radioisotope, and wherein calculating the sensitivity of the detector equipped with the second collimator to the second radioisotope comprises retrieving, based on the indication, a predetermined sensitivity of the detector equipped with the second collimator to the second radioisotope, and adjusting the predetermined sensitivity based on the measured sensitivity and a predetermined sensitivity of the detector equipped with the first collimator to the first radioisotope.

In yet another embodiment, a method for an imaging system comprises: measuring a sensitivity of a detector equipped with a first collimator to a first radioisotope; acquiring, with the detector equipped with a second collimator, image data of a subject injected with a second radioisotope; correcting the image data based on the measured sensitivity and a sensitivity table; and calculating a quantitative parameter based on the corrected image data.

In a first example of the method, the sensitivity table includes a plurality of sensitivity measurements for a second imaging system similar to the imaging system, wherein each of the plurality of sensitivity measurements corresponds to each combination of a plurality of collimators and a plurality of radioisotopes. In a second example of the method optionally including the first example, the plurality of collimators include one or more of a parallel hole collimator, a slanthole collimator, a converging collimator, a diverging collimator, a fanbeam collimator, and a pinhole collimator, and wherein the plurality of radioisotopes includes one or more of an isotope of technetium, an isotope of iodine, an isotope of cobalt, an isotope of indium, an isotope of selenium, an isotope of xenon, an isotope of samarium, an isotope of chromium, an isotope of krypton, an isotope of thallium, and an isotope of gallium. In a third example of the method optionally including one or more of the first and second examples, correcting the image data based on the measured sensitivity and the sensitivity table comprises calculating an adjusted sensitivity of the detector equipped with the second collimator to the second radioisotope based on a predetermined sensitivity of the detector equipped with the second collimator to the second radioisotope and the measured sensitivity, and correcting the image data based on the adjusted sensitivity. In a fourth example of the method optionally including one or more of the first through third examples, the quantitative parameter comprises a standardized uptake value. In a fifth example of the method optionally including one or more of the first through third examples, the method further comprises generating an image from the corrected image data, and outputting the image to a display device.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for a processor of a nuclear medicine imaging system, comprising:
   acquiring, with a detector including a first collimator used to adjust sensitivity of the detector, scan data of a first subject administered with a first radioisotope;
   calculating, with the processor, a first sensitivity of the detector based on the first collimator and the first radioisotope;
   calculating, with the processor, a quantitative parameter from the acquired scan data of the first subject based on the calculated first sensitivity;
   acquiring, with the detector, including a second collimator used to adjust sensitivity of the detector, scan data of a phantom including a second radioisotope, and calculating, based on the scan data of the phantom, with the processor, a second sensitivity of the detector including the second collimator to the second radioisotope;
   acquiring, with the detector including a third collimator used to adjust sensitivity of the detector, scan data of a second subject administered with a third radioisotope;
   calculating, with the processor, a third sensitivity of the detector including the third collimator based on a sensitivity table and the second sensitivity of the detector including the second collimator to the second radioisotope; and calculating, with the processor, the quantitative parameter from the acquired scan data of the second subject based on the calculated third sensitivity.

2. The method of claim 1, wherein calculating the sensitivity of the detector comprises retrieving, from the sensitivity table, a predetermined sensitivity of the detector for the first collimator and the first radioisotope, and adjusting the predetermined sensitivity based on the measured sensitivity of the detector including the second collimator to the second radioisotope.

3. The method of claim 2, wherein the sensitivity table includes a sensitivity measurement for each combination of a plurality of collimators and a plurality of radioisotopes, wherein the plurality of collimators includes one or more of a parallel hole collimator, a slanthole collimator, a converging collimator, a diverging collimator, a fanbeam collimator, and a pinhole collimator, and wherein the plurality of radioisotopes includes one or more of an isotope of technetium, an isotope of iodine, an isotope of cobalt, an isotope of indium, an isotope of selenium, an isotope of xenon, an isotope of samarium, an isotope of chromium, an isotope of krypton, an isotope of thallium, and an isotope of gallium.

4. The method of claim 1, wherein the quantitative parameter comprises a standardized uptake value.

5. The method of claim 1, further comprising correcting the acquired scan data, with the processor, based on the calculated sensitivity, and wherein the quantitative parameter is calculated based on the corrected acquired scan data.

6. The method of claim 5, further comprising displaying, via a display device communicatively coupled to the processor, an image generated from the corrected acquired scan data.

7. A system for nuclear medicine imaging, comprising:
a detector configured to detect radiation and to generate electrical signals in response to the detected radiation;
a processor communicatively coupled to the detector and configured with instructions in non-transitory memory that when executed cause the processor to:
acquire, with the detector equipped with a first collimator used to adjust sensitivity of the detector, scan data of a phantom including a first radioisotope;
calculate a first sensitivity of the detector equipped with the first collimator to the first radioisotope based on the acquired scan data of the phantom;
acquire, with the detector equipped with a second collimator used to adjust sensitivity of the detector, scan data of a first subject administered with a second radioisotope;
calculate a second sensitivity of the detector equipped with the second collimator to the second radioisotope based on the first sensitivity of the detector equipped with the first collimator to the first radioisotope and a sensitivity table stored in the non-transitory memory; and
correct the acquired scan data of the first subject based on the calculated second sensitivity; and
an input device communicatively coupled to the processor;
wherein the processor is further configured with instructions in the non-transitory memory that when executed cause the processor to:
receive, from the input device, an indication of the second collimator and the second radioisotope; and wherein calculating the second sensitivity of the detector equipped with the second collimator to the second radioisotope comprises:
retrieving, based on the indication, a first predetermined sensitivity of the detector equipped with the second collimator to the second radioisotope, from the sensitivity table, and
adjusting the first predetermined sensitivity based on the first sensitivity and a second predetermined sensitivity of the detector equipped with the first collimator to the first radioisotope.

8. The system of claim 7, further comprising a display device communicatively coupled to the processor, wherein the processor is further configured with instructions in the non-transitory memory that when executed cause the processor to output, via the display device, an image generated from the corrected scan data of the first subject.

9. The system of claim 7, wherein the sensitivity table includes a sensitivity measurement for each combination of a plurality of collimators and a plurality of radioisotopes.

10. The system of claim 7, wherein the processor is further configured with instructions in the non-transitory memory that when executed cause the processor to calculate a quantitative parameter from the acquired scan data of the first subject based on the calculated first sensitivity.

11. The system of claim 10, wherein the quantitative parameter comprises a standardized uptake value.

12. A method for a processor of a nuclear medicine imaging system, the method comprising:
calculating, with the processor, a first sensitivity of a detector equipped with a first collimator used to adjust sensitivity of the detector to a first radioisotope;
acquiring, with the detector equipped with a second collimator used to adjust sensitivity of the detector, image data of a first subject injected with a second radioisotope;
correcting, with the processor, the image data based on the first sensitivity and a sensitivity table; and
calculating, with the processor, a quantitative parameter based on the corrected image data;
wherein correcting the image data based on the measured sensitivity and the sensitivity table comprises calculating, with the processor, an adjusted sensitivity of the detector equipped with the second collimator to the second radioisotope based on a predetermined sensitivity of the detector equipped with the second collimator to the second radioisotope and the first sensitivity, and correcting, with the processor, the image data based on the adjusted sensitivity.

13. The method of claim 12, wherein the sensitivity table includes a plurality of sensitivity measurements acquired with a second imaging system similar to the nuclear medicine imaging system, wherein each of the plurality of sensitivity measurements corresponds to each combination of a plurality of collimators and a plurality of radioisotopes.

14. The method of claim 13, wherein the plurality of collimators includes one or more of a parallel hole collimator, a slanthole collimator, a converging collimator, a diverging collimator, a fanbeam collimator, and a pinhole collimator, and wherein the plurality of radioisotopes includes one or more of an isotope of technetium, an isotope of iodine, an isotope of cobalt, an isotope of indium, an isotope of selenium, an isotope of xenon, an isotope of samarium, an isotope of chromium, an isotope of krypton, an isotope of thallium, and an isotope of gallium.

15. The method of claim 12, wherein the quantitative parameter comprises a standardized uptake value.

16. The method of claim 12, further comprising generating, with the processor, an image from the corrected image data, and outputting the image to a display device communicatively coupled to the processor.

* * * * *